Oct. 19, 1965  W. S. MILLER  3,212,398

DISTORTION FREE PROJECTION SYSTEM

Filed Aug. 15, 1962  2 Sheets-Sheet 1

WENDELL S. MILLER
INVENTOR.

BY William P. Green
ATTORNEY

Oct. 19, 1965 W. S. MILLER 3,212,398
DISTORTION FREE PROJECTION SYSTEM
Filed Aug. 15, 1962 2 Sheets-Sheet 2
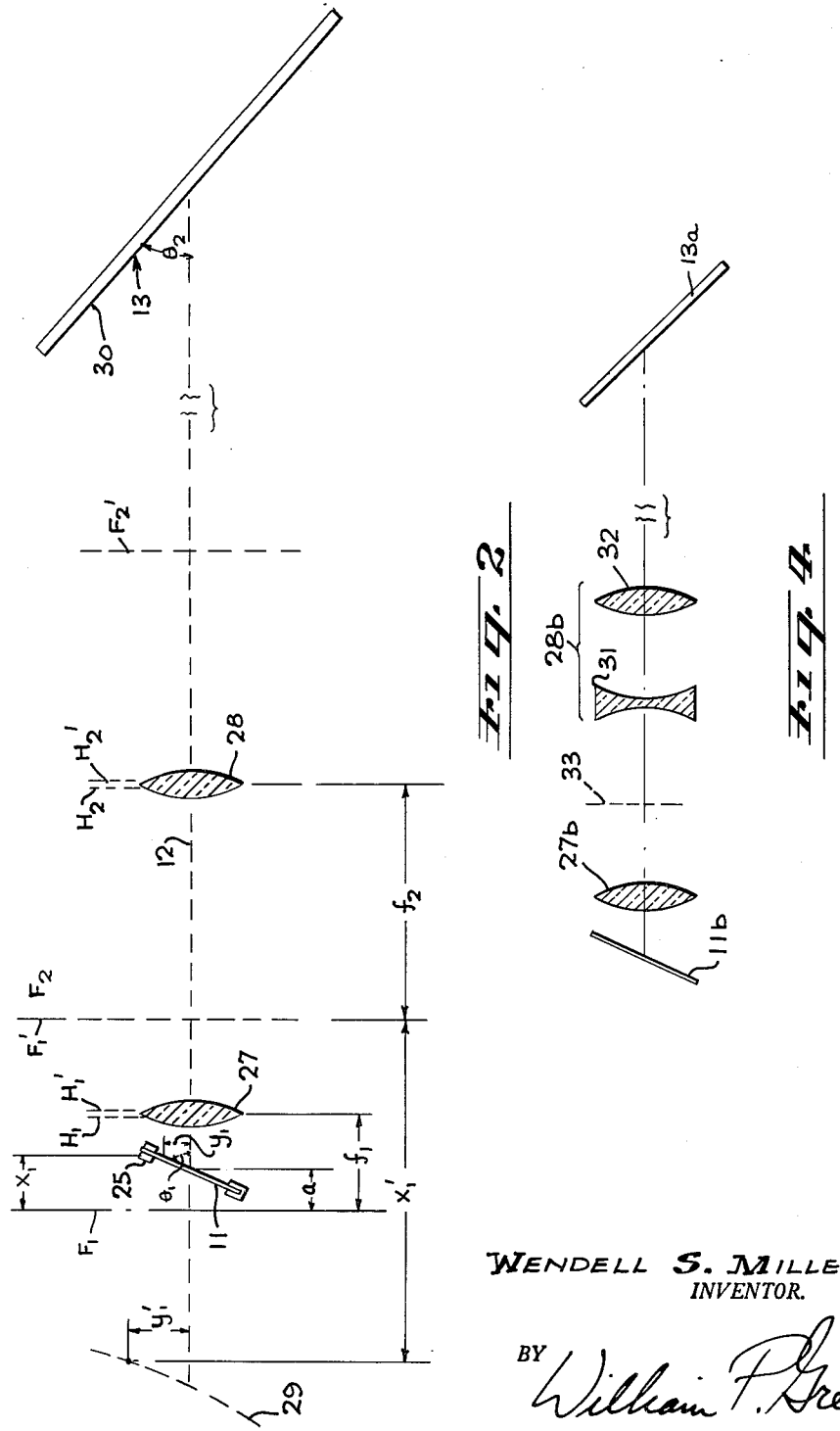
WENDELL S. MILLER
INVENTOR.
BY William P. Green
ATTORNEY

United States Patent Office 3,212,398
Patented Oct. 19, 1965

3,212,398
DISTORTION FREE PROJECTION SYSTEM
Wendell S. Miller, 1341 Comstock Ave.,
Los Angeles, Calif.
Filed Aug. 15, 1962, Ser. No. 217,186
7 Claims. (Cl. 88—24)

This invention relates to an improved projection system, for projecting motion picture or still pictures onto a screen and particularly onto a screen which is inclined with respect to the projection axis of the apparatus.

In projecting an image onto an inclined screen, there is a tendency for the projected image to be distorted by reason of the screen inclination. Specifically, since different portions of the inclined screen are necessarily located different distances from the projector, light travelling to these different areas must travel different distances, and therefore flares to a relatively enlarged or widened condition at the more distant points, relative to the condition of a corresponding picture area at a less distant location. The overall result is to distort an initially rectangular image to a trapezoidal configuration, with similar distortion of all portions of the image.

In my copending application Ser. No. 205,045, filed June 25, 1962, on Controlled Distorter, I have disclosed an arrangement for overcoming the above discussed distortion problems in projecting onto an inclined screen, by purposely predistorting the image prior to projection, in a manner compensating for the distortion caused by projection, and therefore resulting in the formation of an ultimate image which is properly proportioned with respect to the film or other element from which the initial image is taken. In that application, a fiber optic device was utilized as the predistorter.

The general object of the present invention is to provide another predistorting arrangement for achieving the above discussed purpose of overcoming distortion in an inclined screen system, and preferably by accomplishing this purpose without the necessity for use of a fiber optic type distorter. In particular, the present invention achieves the discussed purpose by the use of a lens system consisting of lens components in an afocal arrangement. By this structure, I am able to produce a projected image which is inclined at any desired angle with respect to the projection axis, and is produced in both properly focused and undistorted condition on the inclined screen.

Structurally, a projection system embodying the invention includes a first lens structure and a second lens structure, both of positive focal length, with the two structures so positioned relative to one another that the secondary focal plane of the first lens structure coincides approximately, and preferably substantially exactly, with the primary focal plane of the second lens structure. A film or other sheet of material carrying an image may then be placed at a location relative to the first of the two lens structures to cause a corresponding image to be projected by the lens structures onto the inclined screen. The film or other object element is desirably held at an inclined position with respect to at least one and preferably both of the lenses, so that the projected image will be in proper focus and undistorted condition on the inclined screen.

In my Patent No. 2,974,565, issued March 14, 1961, on Projection System Using Screen With Facets, and in my presently pending application Serial No. 88,889, filed February 13, 1961, on Screens for Projecting Systems, there are shown certain inclined screen projection systems having specially positioned light traps located in such relation to the inclined screens as to trap ambient light falling on the screen in a manner allowing the screen to be used in an area having substantial ambient light present. The predistorting system of the present application is especially desirable for use in systems of this previously disclosed type, and will be discussed primarily in the present application as applied to that type of use.

The above and other features and objects of the present invention will be better understood from the followed detailed description of the typical embodiments illustrated in the accompanying drawings, in which:

FIG. 2 is a schematic representation of the afocal optical arrangement utilized in the FIG. 1 projection system;

FIG. 4 is a representation of a variational type of lens system which may be employed in accordance with the invention.

Figure 1:
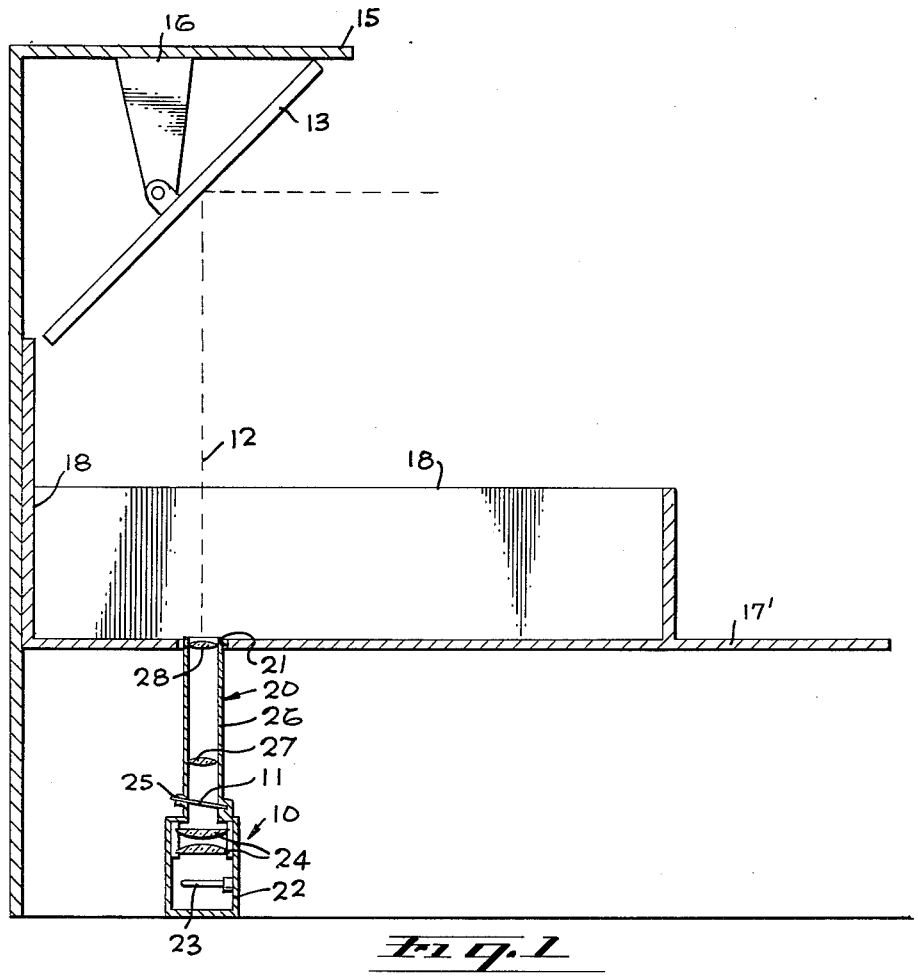
FIG. 1 is a vertical section through a projection system embodying the invention.

The projection system of FIG. 1 includes a projector 10 adapted to receive a film 11 carrying an image, and to project the image along essentially an axis 12 onto a screen 13 which is inclined with respect to the axis. The screen is viewed from the right as seen in FIG. 1, along a viewing axis 14 and other similar axes extending generally parallel to axis 14. Screen 13 may be secured to a housing 15 by a mounting bracket 16, and may typically be located in a position of 45 degree inclination, as shown. The projection axis 12 of projector 10 is typically represented as extending vertically. In accordance with the teachings of my Patent No. 2,974,565 and my copending application Serial No. 88,889, there may be provided beneath screen 13 a light trap consisting of a horizontal wall 17' and peripheral vertical walls 18, all formed of a black material capable of absorbing substantially all light falling on these surfaces. The walls 17' and 18 are of a size to occupy the entire area from which light may be reflected by the front face of screen 13 toward the viewing location. Thus, any ambient light which falls on walls 17' and 18 is absorbed, and is not reflected to the viewers by screen 13 to interfere with the contrast of the image on the screen. Further, any ambient light coming from the viewing location or other nearby locations and striking screen 13 is reflected downwardly by the screen onto walls 17' and 18, to be absorbed by those walls as a trap structure, so that again the light cannot interfere with the desired contrast of the image on the screen. The projector 10 has its lens system 20 received within an opening 21 in bottom wall 17', to project the picture upwardly through wall 17', with the light absorbent bottom wall 17' completely surrounding the exposed portion of the projector.

To discuss now the structure of the projector 10 itself, this projector includes the usual housing 22, containing an electrically energized light bulb 23 and two condensing lenses 24. Lenses 24 uniformly illuminate the image on transparent film 11, which is removably held within a suitable film holder 25 at an oblique angularity with respect to axis 12. Beyond holder 25, the projector includes lens system 20, consisting of a tube 26 containing a first lens structure 27 and a second lens structure 28. These lens structures 27 and 28 have positive focal length, and in the simplest form of the invention illustrated in FIGS. 1 and 2 consist of two single element symmetrical double convex lenses. It is noted that the inclination of film 11, with respect to axis 12, is in a direction the opposite of the inclination of screen 13. It is also noted that the inclination of film 11 is less than that of the screen, that is, the plane of film 11 is closer to a true normal plane, with respect to axis 12, than is that of screen 13.

FIG. 2 represents diagrammatically film 11, lenses 27 and 28, and screen 13. The primary and secondary principal planes of lens 27 are represented at $H_1$ and $H_1'$, while the primary and secondary focal planes of this lens are represented at $F_1$ and $F_1'$. Similarly, the primary and secondary principal planes of the second lens 28 are represented at $H_2$ and $H_2'$, and the primary and secondary focal planes of this lens are represented at $F_2$ and $F_2'$.

The two lenses 27 and 28 are both centered about and disposed transversely of the main projection axis 12. Also, in order to render the lens system consisting of lenses 27 and 28 afocal, these lenses are so positioned that the secondary focal plane $F_1'$ of the first lens 27 and the primary focal plane $F_2$ of the second lens 28 are approximately coincident, and preferably substantially exactly coincident, as shown. When the projector is to be utilized for projecting an image on a screen which is spaced a very substantial distance from the projector, with the projected image being considerably larger than that on the film, it is preferred that the film holder 25 be so located as to hold the film at a location within the primary focal length of lens 27, that is, between primary focal plane $F_1$ and principal plane $H_1$.

When the lenses are positioned in the above discussed manner, and film 11 is located at a proper inclination and location for producing an image on screen 13, that image is produced in the following manner:

First lens 27 causes the formation of a hyperbolic greatly distorted virtual image 29 a considerable distance behind film 11, and representing the picture or other image carried by the illuminated film. Thus, lens 27 functions to produce a predistorted image, whose distortion is just sufficient to exactly compensate for the distortion which would otherwise be caused in the image by virtue of the inclination of screen 13, so that the image as finally seen on the screen is completely undistorted. This image is projected onto the screen by second lens 28, which views the distorted hyperbolic virtual image 29 produced by lens 27, and projects it onto the screen. The angularities of film 11 and screen 13 are so designed as to maintain each portion of the image on the screen in exact focus, and when so related, the image is also distortion free, as discussed. If it were not for the predistortion of the image by lens 27, the light falling on the upper portion 30 of the screen (as viewed in FIG. 2) would, because it travels a shorter distance than the light falling on the rest of the screen, cause flaring or "keystone distortion" of the projected picture.

To now illustrate mathematically the manner in which the above discussed system produces an undistorted image on screen 13, assume first of all the following notation, in addition to that given hereinabove:

$a$=distance from primary focal plane of first lens to intercept of object (film) on optic axis.
$y_1$=distance from optic axis to a particular object point in the meridinal plane.
$y_1'$=distance from optic axis to a particular corresponding image point of the first lens system in the meridinal plane.
$x_1$=axial distance of initial object point from the primary focal plane of first lens.
$x_1'$=axial distance of corresponding image point in first lens from the secondary focal plane of first lens.
$y_2$, $y_2'$, $x_2$, $x_2'$ have meanings corresponding to $y_1$, $y_1'$, $x_1$ and $x_1'$, respectively, but for the second lens 28.
$f_1$ and $f_2$=focal lengths of first and second lenses, respectively, measured from primary focal plane to primary principal plane.
$\theta_1$=The angle of film 11 to axis 12.
$\theta_2$=The angle of screen 13 and the image thereon to axis 12.

Using the above notation, a point on the object (film 11) located a distance $y_1$ above the axis with the film tipped at an angle $\theta_1$ whose tangent is $1/\alpha$ will be situated with $x_1=(a+\alpha y_1)$.

The image of this point in the first lens system will have $$x_1' = \frac{-f_1^2}{(a+\alpha y_1)}$$

and $$y_1' = \frac{y_1 f_1}{x_1} = \frac{y_1 f_1}{(a+\alpha y_1)} = y_2$$

If the secondary focal plane of the first lens system coincides with the primary focal plane of the second lens system $$x_2 = x_1' = \frac{-f_1^2}{(a+\alpha y_1)}$$

and $$x_2' = \frac{-f_2^2}{-f_1^2/(a+\alpha y_1)} = \left(\frac{f_2}{f_1}\right)^2 (a+\alpha y_1)$$

$$y_2' = -y_1\left(\frac{f_2}{f_1}\right) \tan \theta_2 = \frac{-f_1}{f_2} \tan \theta_1$$

Since the above derivation shows that $y_2'$ equals $y_1$ times a constant $$\left(\frac{-f_2}{f_1}\right)$$

it is apparent that the discussed lens system eliminates distortion in the ultimate projected image.

Figure 3:
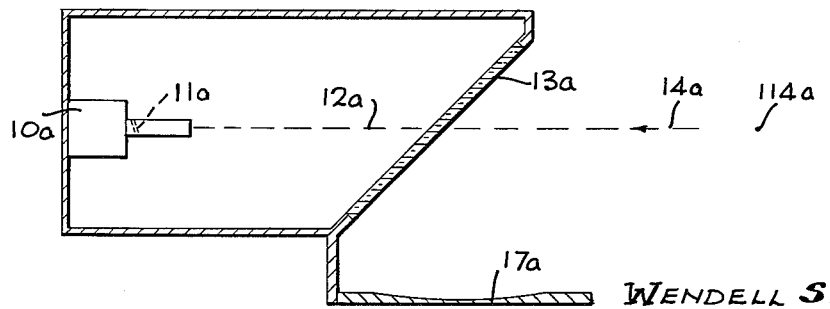
FIG. 3 is a vertical section through a second form of projection system, having a rear projection type screen, and in which the predistorting lens system of the invention may be employed.

Reference is now made to FIG. 3, in which a projector 10a similar to that shown in FIG. 1 projects an image of a film 11a onto the rear side of an inclined rear projection screen 13a, so that the image produced on the screen may be viewed from a viewing location such as that represented at 114a, along a line 14a and other viewing lines generally parallel thereto. The lens system within projector 10a may be the same as that discussed in connection with FIGS. 1 and 2, to produce an image on the screen which is focused at all points and is completely undistorted even though the screen is inclined with respect to the main projection axis 12a. In this FIG. 3 arrangement, the light trap beneath the screen 13a is illustrated as a horizontal wall or structure 17a formed of a black totally light absorbent material which can not reflect or emit any light capable of being reflected by screen 13a toward the viewing location. Thus, the light trap 17a again prevents any ambient light from affecting the contrast of the projected picture.

FIG. 4 shows another lens system which may be utilized in either of the projectors 10 or 10a in FIGS. 1 and 3, and which system is designed to accomplish the results of the arrangement discussed in detail in connection with FIG. 2, but will accomplish this result in an overall lens system or tube of much shorter length than that of FIG. 2. The arrangement of FIG. 4 includes a first lens 27b which may be identical with lens 27 of FIG. 2, and which may be positioned in the same relation as in FIG. 2 with respect to inclined film 11b. Instead of the second lens 28, the arrangement of FIG. 4 utilizes a conventional telephoto lens assembly 28b, consisting of a negative lens 31 and a positive lens 32. The assembly 28b formed by the two lenses 31 and 32 together has its primary focal plane received in coincidence with the secondary focal plane of lens 27b, at the location 33, so that the two lens structures 27b and 28b function together to attain the same distortion eliminating effect accomplished by lenses 27 and 28 in FIG. 2. The advantage of the FIG. 4 arrangement lies in the fact that, for a given magnification ratio between size of projected image and size of film, the three lens assembly of FIG. 4 may have a much shorter overall length than the two lens assembly of FIG. 2.

It is contemplated that some advantages may be attained by use of the lens system of the present invention in conjunction with a non-inclined screen and film, though the unique utility of the system resides especially in its desirability for use with inclined screens. With a non-inclined screen and projection object, there is a fixed ratio between the size of the object and the image whenever the image is in focus on the screen, and regardless of the distance of the projector from the screen, with this fixed ratio being determined by the ratio between the focal lengths of the first and second lens structures of the overall lens system. This constancy of size of the image facilitates focusing of the image even in lieu of adequately sharp image elements by means of which the degree of focus could be estimated, since the image will always be in focus when it occupies a specific predetermined size on the screen, regardless of the placing of the projector. Such variation in image size is of course obtained by relative movement of the object (film) and the entire afocal lens structure.

I claim:

1. A projector comprising a projection lens assembly consisting of first and second optical lens structures each of positive focal length and each having a primary focal plane and a secondary focal plane, the secondary focal plane of said first lens structure coinciding approximately with the primary focal plane of said second lens structure, and means for holding a sheet of material carrying an image at a location within the primary focal length of said first optical lens structure from which said lens assembly will project said image directly onto a screen.

2. A projector for projection of an image on an inclined screen, said projector comprising a projection lens assembly whose component optical elements of non-zero power consists of first and second optical lens structures each of positive focal length and each having a primary focal plane and a secondary focal plane, the secondary focal plane of said first lens structure coinciding approximately with the primary focal plane of said second lens structure, said projection lens assembly defining an optical axis, and means for holding a sheet of material carrying an image inclined with respect to said optical axis at a location within the primary focal length of said first lens structure and from which said lens assembly will project said image onto a screen free of keystone distortion due to such off axis projection.

3. A projector of substantially zero focal power comprising a projection lens assembly including first and second optical lens structures each of positive focal length and each having a primary focal plane, a secondary focal plane and an axis, the secondary focal plane of said first lens structure coinciding approximately with the primary focal plane of said second lens structure, and means for holding a sheet of material carrying an image at an oblique angle to said axis at a location from which said lens assembly will project said image onto a screen and in a position of oblique angularity to the axis of one of said lens structures.

4. A projector defining an optical axis and for projection of an image onto an inclined screen, said projector comprising a projection lens assembly including first and second optical lens structures each of positive focal length and each having a primary focal plane and a secondary focal plane, the secondary focal plane of said first lens structure coinciding substantially exactly with the primary focal plane of said second lens structure, said second lens structure having a greater focal strength than said first lens structure, and means for holding a sheet of material carrying an image within the primary focal length of said first lens structure and inclined with respect to said optic axis at a location from which said lens assembly will project said image onto a screen with compensation for the keystone distortion which would otherwise be produced by such off axis projection.

5. An afocal projector defining an optical axis and adapt to project in focus optical material on an inclined screen with compensation for distortion which such off axis projection would otherwise produce, said projector comprising a projection lens assembly including first and second optical lens structures each of positive focal length and each having a primary focal plane and a secondary focal plane, the secondary focal plane of said first lens structure coinciding approximately with the primary focal plane of said second lens structure, means for holding a light passing film carrying an image inclined with respect to said optical axis, at a location within the primary focal length of said first lens structure from which said lens assembly will project said image onto a screen, and means for trans-illuminating said film.

6. The combination comprising a projector for holding a sheet of material carrying an image and projecting said image along essentially a predetermined axis, and a screen onto which said image is projected and which is inclined at an oblique angle relative to said axis, said projector including first and second optical lens structures each of positive focal length and each having a primary focal plane and a secondary focal plane, the secondary focal plane of said first lens structure coinciding approximately with the primary focal plane of said second lens structure, and means for holding said sheet of material carrying said image at a location within the primary focal length of said first lens structure and from which said lens assembly will project said image onto said screen and in a position of inclination with respect to at least one of said lens structures to compensate for the distortion which would otherwise occur as a result of the inclination of the screen.

7. The combination comprising a projector for holding a sheet of material carrying an image and projecting said image along essentially a predetermined axis, and a screen onto which said image is projected and which is inclined at an oblique angle relative to said axis, said projector including first and second optical lens structures each of positive focal length and each having a primary focal plane and a secondary focal plane, the secondary focal plane of said first lens structure coinciding approximately with the primary focal plane of said second lens structure, means for holding said sheet of material carrying said image at a location within the primary focal length of said first lens structure and from which said lens assembly will project said image onto said screen and in a position of inclination with respect to at least one of said lens structures to compensate for the distortion which would otherwise occur as a result of the inclination of the screen, and means for illuminating said sheet of material.

References Cited by the Examiner

UNITED STATES PATENTS

| | | | |
|---|---|---|---|
| 751,347 | 2/04 | Scheimpflug | 88—24 |
| 1,291,274 | 1/19 | Uebelmesser | 88—24 |
| 1,651,574 | 12/27 | Beechlyn | 352—85 |
| 2,552,238 | 5/51 | Turner | 88—57 |
| 3,022,706 | 2/62 | Kargl | 88—24 |

FOREIGN PATENTS 86,807 7/21 Austria.

OTHER REFERENCES

Jacobs, D. H.: "Theory of Stops," Fundamentals of Optical Engineering, McGraw-Hill, New York, 1943, page 49.

NORTON ANSHER, *Primary Examiner.*

WILLIAM MISIEK, EVON C. BLUNK, *Examiners.*